United States Patent [19]

Miyamoto et al.

[11] Patent Number: 4,897,537

[45] Date of Patent: Jan. 30, 1990

[54] AUTOMATIC FOCUS ADJUSTING SYSTEM OF MICROSCOPE EMPLOYED IN SURFACE INSPECTION APPARATUS

[75] Inventors: Seiichi Miyamoto, Osaka; Yo Tajima, Ashiyashi; Masaru Maruki, Amagasaki; Masaru Hanatani, Nishinomiyashi, all of Japan

[73] Assignee: Kanzaki Paper Manufacturing Co., Ltd., Hyogo, Japan

[21] Appl. No.: 173,416

[22] Filed: Mar. 25, 1988

[30] Foreign Application Priority Data

Mar. 30, 1987 [JP] Japan .................................. 62-78484

[51] Int. Cl.⁴ ............................................. G01J 1/20
[52] U.S. Cl. ..................................... 250/201; 350/507
[58] Field of Search ................ 250/201; 350/530, 507, 350/526; 358/227

[56] References Cited

U.S. PATENT DOCUMENTS

| | | | |
|---|---|---|---|
| 4,203,031 | 5/1980 | Kamachi et al. | 250/201 |
| 4,320,946 | 3/1982 | Aoki et al. | 250/201 |
| 4,510,384 | 4/1985 | Grimbleby et al. | 250/201 |
| 4,614,865 | 9/1986 | Hayashi | 250/201 |
| 4,740,678 | 4/1988 | Horikawa | 250/201 |

FOREIGN PATENT DOCUMENTS 28340 3/1977 Japan .

Primary Examiner—David C. Nelms
Assistant Examiner—Michael Messinger
Attorney, Agent, or Firm—Morgan & Finnegan

[57] ABSTRACT

An automatic focus adjusting system for a surface inspection microscope including a sheet setting stage, a microscope for observing a sheet surface set on the stage, a television camera for picking up an image observed by the microscope and a focus adjusting system. The system irradiates the back or front of an optically transparent sheet set on the stage creating an image on the front surface of the sheet. The image's contrast varies depending on the inner physical structure of the sheet. The television camera's video signals are processed by a focus evaluation circuit. The image contrast of the sheet's front surface image generates a contrast frequency allowing the focus evaluation circuit to calculate the focus evaluation degree. The system automatically adjusts the stage and compares the present focus evaluation degree with the prior focus evaluation degree. If the current focusing evaluation degree is greater than the prior focus evaluation degree the stage is adjusted one step and the process repeated until the focus evaluation circuit determines that the current focus evaluation degree is not greater than the prior focus evaluation degree.

2 Claims, 2 Drawing Sheets $$V = |X_1 - X_2| - |X_2 - X_3| + \cdots + |X_{n-1} - X_n|$$
$$+ |X_n - X_{n+1}|$$

AUTOMATIC FOCUS ADJUSTING SYSTEM OF MICROSCOPE EMPLOYED IN SURFACE INSPECTION APPARATUS

BACKGROUND OF THE INVENTION

1. Field of the Invention

The present invention relates to an automatic focus adjusting system of a microscope employed in a surface inspection apparatus.

2. Prior Art

Various automatic focus adjusting systems employed in optical image formation apparatuses such as a camera, a microscope, and the like have been proposed. These proposals are classified into three kinds. One of them uses trigonometrical survey system. This system is unsuitable for the microscope. The second one is to analyze a video signal converted from an optical image. Various suggestions have been made with respect to methods for analyzing the video signal. The third one is to form two images of an object having a parallax.

Except the trignometrical survey system, the other automatic focus adjusting systems described above can be utilized on condition that a video signal having a contrast is obtained. Therefore, when the surface of a plain and blank sheet is inspected by a microscope, these systems are not effective unless lights are projected on the sheet to form a pattern in shades thereon so that the pattern is used as a target to be observed in an automatic focus adjustment. The sheet is moved under the microscope to inspect its surface. At this time, if the surface of the sheet is not fluctuated in accordance with the movement of the sheet, a focusing for an inspection can be maintained by giving a mark at a position having no influence in inspecting the sheet surface, and by bringing the mark into focus. When the sheet surface is irregular, focusing operations are required to be made each time the sheet moves. If a sheet is macroscopically flat, its horizontal movement macroscopically gives no appearance of fluctuation in the case of a microscope having a low magnification. If a microscope having a high magnification is used to inspect such a macroscopically flat sheet, even a slight irregularity of the sheet surface corresponds to a serious vertical fluctuation of the surface of the sheet under the inspection, so that the surface under the inspection becomes out of focus. This is because the focal depth of such a high magnification microscope is short and the visual field thereof is narrow. Therefore, it is necessary to make focus adjusting operations each time the sheet moves. In addition, the above conventional method for making an automatic focus adjustment is not applicable to the inspection of a plain and blank sheet surface.

SUMMARY OF THE INVENTION

The present invention has been developed with a view to substantially solving the above disadvantages. Accordingly, it is an essential object of the present invention to provide an automatic adjusting system of a microscope employed in the surface inspection of such a sheet whose surface looks macroscopically plain and blank, but is microscopically irregular or non-uniform in its inner structure, and transparent in some extent as paper, and a plastic sheet, for example, a plastic filtration film.

In order to accomplish the above object, an automatic focus adjusting system of a microscope employed in inspecting a sheet surface in accordance with the present invention having a sheet setting stage, a microscope for observing the surface of a sheet set on the sheet setting stage, and a television camera for picking up an image observed by the microscope comprises: stage holding and setting means for holding and vertically stepping the sheet setting stage to finely adjust the level of the sheet relative to the objective lens of the microscope; back surface irradiation means for irradiating the back surface of an optically transparent sheet set on the sheet setting stage and for transmitting a light through the sheet to form an image, on the front surface to be observed, having a contrast which varies depending on the inner physical structure of the sheet; a focus evaluation circuit for calculating a focus evaluation degree represented by a contrast frequency of the image of the front surface according to a series of video signals generated along a pick-up scanning line of the image having a contrast picked up by the television camera through the microscope and held at a level relative to the objective lens, and comparing a focus evaluation degree currently obtained with that previously obtained when the sheet setting stage is at a level different from the current level by one step, and detecting whether or not the focus evaluation degree currently obtained is greater than that previously obtained; and a controlling and computing circuit for moving by one step the stage holding and stepping means in response to an output from the focus evaluation circuit indicating that a focus evaluation degree currently obtained is greater than that previously obtained, and for stopping the movement of the stage holding and stepping means in response to an output from the focus evaluation circuit indicating that the focus evaluation degree currently obtained is not greater than that previously obtained and thereby representing that the focal point of the microscope is matched with the area of the sheet surface to be inspected.

When the surface of a sheet somewhat transparent is observed by a microscope, the sheet surface is required to be irradiated in such an extent as to be observed. As described hereinbefore, if the sheet surface is plain and blank, the image of the sheet surface observed by the microscope has no contrast unless it has flaws or anything attached thereto. Accordingly, a focal point detection cannot be performed by a light irradiated with a light onto the sheet surface to be inspected. According to the system of the present invention, since the back surface of the sheet is irradiated with a light to detect a focal point, an image having a contrast is projected on the front surface of the sheet because of the difference of the inner structure of the sheet. Then, the system executes an appropriate focus evaluating operation, and seeks the condition thereof in the maximum degree of the focus evaluation. As a result, the focal point will be matched with the surface area of the sheet to be inspected.

By the semitransparency of a sheet in the description, it is meant that a light transmission quantity is more than 6% of the quantity of a light to be obtained when no sheet is placed between a light source and a sensor comprising a photoelectric conversion element capable of detecting a light in the visible range. The semitransparency includes a substantially transparent sheet.

When a sheet to be inspected is only substantially transparent, the voltage to energize a light source is reduced. Thus, a signal representing any latent contrast of an image is obtained.

BRIEF DESCRIPTION OF THE DRAWINGS

The object and the feature of the present invention will become apparent from the following description taken in conjunction with the preferred embodiment thereof with reference to the accompanying drawings, in which.

DESCRIPTION OF THE PREFERRED EMBODIMENT

Figure 1:
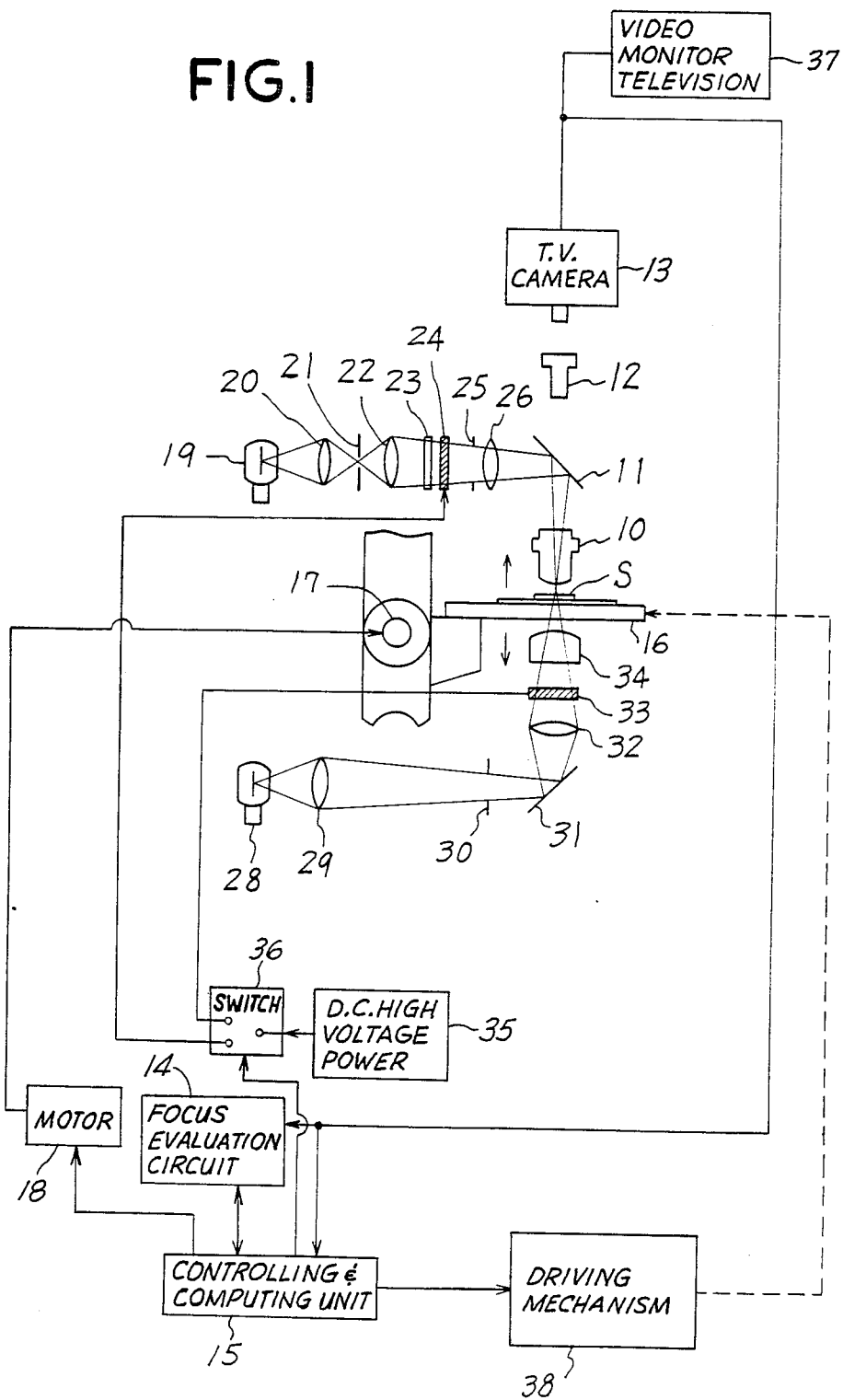
FIG. 1 is a block schematic diagram of the system showing an embodiment in accordance with the present invention.

Referring to FIG. 1, members located upwards from a sheet setting stage 16 are an objective lens 10 of a microscope, a semitransparent mirror 11, a relay lens 12, and a television camera 13 which picks up an image observed by the microscope. Reference numeral 14 designates a focus evaluation circuit to produce a focus evaluation signal in response to video signals outputted from the television camera 13. Reference numeral 15 designates a controlling and computing circuit for the system, and 16 designates a sheet setting stage provided below the objective lens 10. Alongside the sheet setting stage 16, a moving mechanism 17 is provided for moving the sheet setting stage 16 vertically. During a focus adjusting mode, the controlling and computing circuit 15 receives an output from the focus evaluation circuit 14 and applies a signal to a motor 18 for driving the moving mechanism 17. The motor 18 may be a pulse motor or a servo motor. As a result, the sheet setting stage 16 is moved to such a level position as to allow the level of a focus evaluation signal outputted from the focus evaluation circuit 14 to become highest.

Reference numeral 19 designates a reflection image forming light source 19, with a light flux transmitted therefrom being collected on the optical axis of the microscope through a lens 20, an aperture stop 21, a lens 22, a filter 23, an electronic shutter 24, a field stop 25, a lens 26, and the semitransparent mirror 11. The light flux may be focused on the surface of a sheet S by the objective lens 10.

A back surface irradiating system for the sheet S comprises a transmitting image forming light source 28, a lens 29, an aperture 30, a mirror 31, a lens 32, an electronic shutter 33, and a condenser lens 34 disposed below the sheet setting stage 16. A light flux transmitted from the transparent image forming light source 28 is condensed on the sheet S through the above members.

A direct current high voltage power supply 35 is provided for actuating the electronic shutters 24 and 33 with the output voltage therefrom being applied to the electronic shutter 24 or the electronic shutter 33 through a switch 36 controlled by the controlling and computing circuit 15. In an inspection mode, the electronic shutter 24 is actuated by the switch 36, i.e., the electronic shutter 24 permits therethrough the light flux transmitted from the reflection image forming light source 19, while the electronic shutter 33 shuts off the light flux transmitted from the transmitting image forming light source 28. In a focus adjusting mode, the electronic shutter 33 is actuated by the switch 36, that is, the electronic shutter 33 permits therethrough a light flux transmitted from the transmitting image forming light source 28. The change-over from the inspection mode to the focus adjusting mode and vice versa is carried out at a relatively high speed by operating the electronic shutters 24 and 33, with the light reflection image forming light source 19 and the transmitting image forming light source 28 turned on. According to the present invention, electronic shutters are used instead of mechanical shutters for a mode change-over because the former is opened or closed faster than the latter and the former imparts less vibration to the system than the latter, i.e., a surface inspection of a sheet can be performed at a high magnification. A video monitor television 37 is connected to the television camera 13. A driving mechanism 38 is provided for driving the sheet setting stage 16 to be positioned for an inspection.

The operation of this embodiment is described with reference to the drawings. The sheet S is set on the sheet setting stage 16. The surface of the sheet is divided into small areas having approximately $0.1 \times 0.1 mm^2$, and the sheet setting stage 16 is moved in X or Y directions by one area so as to be inspected at a magnification of 1,000 times. The controlling and computing circuit 15 controls the movement of the sheet S in X and Y directions through the driving mechanism 38. When the sheet S is moved by one area, the operation mode enters the focus adjusting mode, that is, the electronic shutter 24 is closed by the switch 36, and then, the electronic shutter 33 is opened so as to irradiate the back surface of the sheet S with a light from the transmitting image forming light source 28. Thereafter, video signals generated along one or a predetermined number of scanning lines outputted from the television camera 13 are inputted to the focus evaluation circuit 14, whereby a focus evaluation calculation is performed by the focus evaluation circuit 14. The controlling and computing circuit 15 drives the motor 18 by one pulse or a predetermined number of pulses so that the sheet setting stage 16 is moved upwards (or downwards) through the moving mechanism 17 for moving the sheet setting stage 16 vertically by a height corresponding to the step distances. After such vertical movement of the sheet setting stage 16, the focus evaluation circuit 14 performs the calculations of a focus evaluation degree with respect to video signals generated along the same scanning lines as that previously used so as to compare the focus evaluation degree obtained currently with that obtained previously. The direction of the vertical movement of the sheet setting stage 16 is initially determined according to the increase or decrease of the focus evaluation degree. If the focus evaluation degree currently obtained equals that previously obtained, the position of the sheet S which takes currently is determined as a focus position to stop the sheet setting stage 16. However, if the evaluation degree currently obtained is more and less than the evaluation degree previously obtained, the sheet setting stage 16 should be moved up and down by one step, respectively. When the movement direction of the sheet setting stage 16 is determined, the calculation of a focus evaluation degree is made with respect to video signals generated along the scanning lines, each time the motor 18 is driven by one pulse or a predetermined number of pulses to move the sheet setting stage 16 by one step. If the focus evaluation degree is still greater than that previously obtained, the same operation is repeated.

If the focus evaluation degree equals or smaller than that obtained previously, a focus completion signal is produced, with the result that the electronic shutter 33 is closed by the switch 36 while the electronic shutter 24 is opened, and the television camera 13 picks up video signals corresponding to one frame for the surface inspection. Normally, these signals should represent no contrast. The controlling and computing circuit 15 detects whether or not a signal having a level over (or below) a predetermined level is included in these signals. If it is detected that such a signal is not included therein, the controlling and computing circuit 15 determines that an observed area has passed the inspection, and the signal level of the inspected area of the sheet S and the X-Y coordinates of the sheet setting stage 16 are stored in the memory. If the level of the video signal of an area of the sheet S is not within the predetermined level, the controlling and computing circuit 15 determines that the area does not pass the inspection, and the signal level of the area and the positions of the X-Y coordinates of the sheet setting stage 16 are stored in the memory. Thus, the inspection of the area is completed. Thereafter, the following area is brought to the position to inspect the surface thereof by controlling the driving mechanism 38 for driving the sheet setting stage 16 in X-Y directions. When the inspections of the respective areas of the sheet surface is completed, the evaluation of the sheet surface is performed in accordance with the number of faulty areas and/or the positions of the faulty areas.

Figure 2:
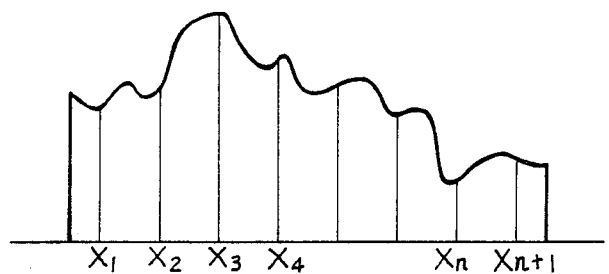
FIG. 2 is a graph illustrating the method for embodiment.

The method for calculating a focus evaluation degree in the embodiment is described with reference to the graph in FIG. 2 showing a video signal generated along a scanning line. Assuming that the signal intensities of the respective pixels are expressed by $X_1, X_2, X_3, \ldots, X_{n+1}$, the value V is determined by the following equation:

$$V = |X_1 - X_2| + |X_2 - X_3| + |X_3 - X_4| + \ldots + |X_n - X_n - X_{n+1}|$$

The calculation of a focus evaluation degree may be performed by comparing the number of signal intensity produced in the same scanning period based on a resolving power which increases in accordance with an obtained focus evaluation degree.

When a sheet surface is inspected at a low magnification, a focus adjustment can be accomplished by a video signal obtained from a light reflected from the sheet surface because fine irregularities of the sheet surface imparts a contrast to a video signal. Thus, the sheet surface can be inspected by this method in the above embodiment. When the sheet surface is inspected at a high magnification, it is difficult to detect a focal point because the visual field of a microscope is narrow and its focal depth is short, i.e., even a slight irregularity of the sheet surface which allows a video signal to have a contrast at a low magnification corresponds to a significant amount of vertical displacement for the objective lens of the microscope, so that a focal point cannot be obtained. Thus, the automatic focus detection system in accordance with the present invention is very efficient for inspecting the surface of a plain and blank sheet.

As described heretofore, when a sheet surface is substantially plain and blank, it is very difficult to detect a focal point by conventional automatic focus detection system because a light is projected toward the sheet surface. According to the present invention, a light irradiates the back surface of the sheet. Therefore, if the internal structure of the sheet is not uniform and semi-transparent, but pervious to a light, the contrast of an image formed by a microscope appears in a video signal. Thus, such a sheet surface as described above can be automatically observed or inspected.

What is claimed is:

1. An automatic focus adjusting system of a microscope employed in inspecting a sheet surface having a sheet setting stage, a microscope for observing the surface of a sheet set on the sheet setting stage, and a television camera for picking up an image observed by the microscope comprising:
   stage holding and stepping means for holding and vertically stepping said sheet setting stage to finely adjust the level of the sheet relative to the objective lens of the microscope;
   back surface irradiation means for irradiating the back surface of an optically transparent sheet set on said sheet setting stage and for transmitting a light through the sheet to form an image, on the front surface to be observed, having a contrast which varies depending on the inner physical structure of the sheet;
   a focus evaluation circuit for calculating a focus evaluation degree represented by a contrast frequency of the image of the front surface according to a series of video signals generated along a pick-up scanning line of the image having a contrast picked up by the television camera through the microscope and held at a level relative to the objective lens, and comparing a focus evaluation degree currently obtained with that previously obtained when said sheet setting stage is at a level different from the current level by one step, and detecting whether or not the focus evaluation degree currently obtained is greater than that obtained previously; and
   a controlling and computing circuit for moving by one step said stage holding and stepping means in response to an output from said focus evaluation circuit indicating that a focus evaluation degree currently obtained is greater than that previously obtained, and for stopping the movement of said stage holding and stepping means in response to an output from said focus evaluation circuit indicating that the focus evaluation degree currently obtained is not greater than that previously obtained and thereby representing that the focal point of the microscope is matched with the area of the sheet surface to be inspected.

2. An automatic focus adjusting system of a microscope employed in inspecting a sheet surface having a sheet setting stage, a microscope for observing the surface of a sheet set on the sheet setting stage, and a television camera for picking up an image observed by the microscope comprising:
   stage holding and stepping means for holding and vertically stepping said sheet setting stage to finely adjust the level of the sheet relative to the objective lens of the microscope;
   front surface irradiation means for irradiating the front surface of an optically transparent sheet set on said sheet setting stage to form an image on the front surface to be observed;
   back surface irradiation means for irradiating the back surface of an optically transparent sheet set on said sheet setting stage and for transmitting a light through the sheet to form an image, on the front surface to be observed, having a contrast which varies depending on the inner physical structure of the sheet;

switching means for selectively energizing either of said front surface irradiation means and said back surface irradiation means;

a focus evaluation circuit for calculating a focus evaluation degree represented by a contrast frequency of the image of the front surface according to a series of video signals generated along a pick-up scanning line of the image having a contrast picked up by the television camera through the microscope and held at a level relative to the objective lens, and comparing a focus evaluation degree currently obtained with that previously obtained when said sheet setting stage is at a level different from the current level by one step, and detecting whether or not the focus evaluation degree currently obtained is greater than that obtained previously; and a controlling and computing circuit for moving by one step said stage holding and stepping means in response to an output from said focus evaluation circuit indicating that a focus evaluation degree currently obtained is greater than that previously obtained, and for stopping the movement of said stage holding the stepping means in response to an output from said focus evaluation circuit indicating that the focus evaluation degree currently obtained is not greater than that previously obtained and thereby representing that the focal point of the microscope is matched with the area of the sheet surface to be inspected.

* * * * *